Sept. 8, 1931.  A. K. SMITH  1,822,382
DATE PITTING MACHINE
Filed Nov. 18, 1927  4 Sheets-Sheet 1
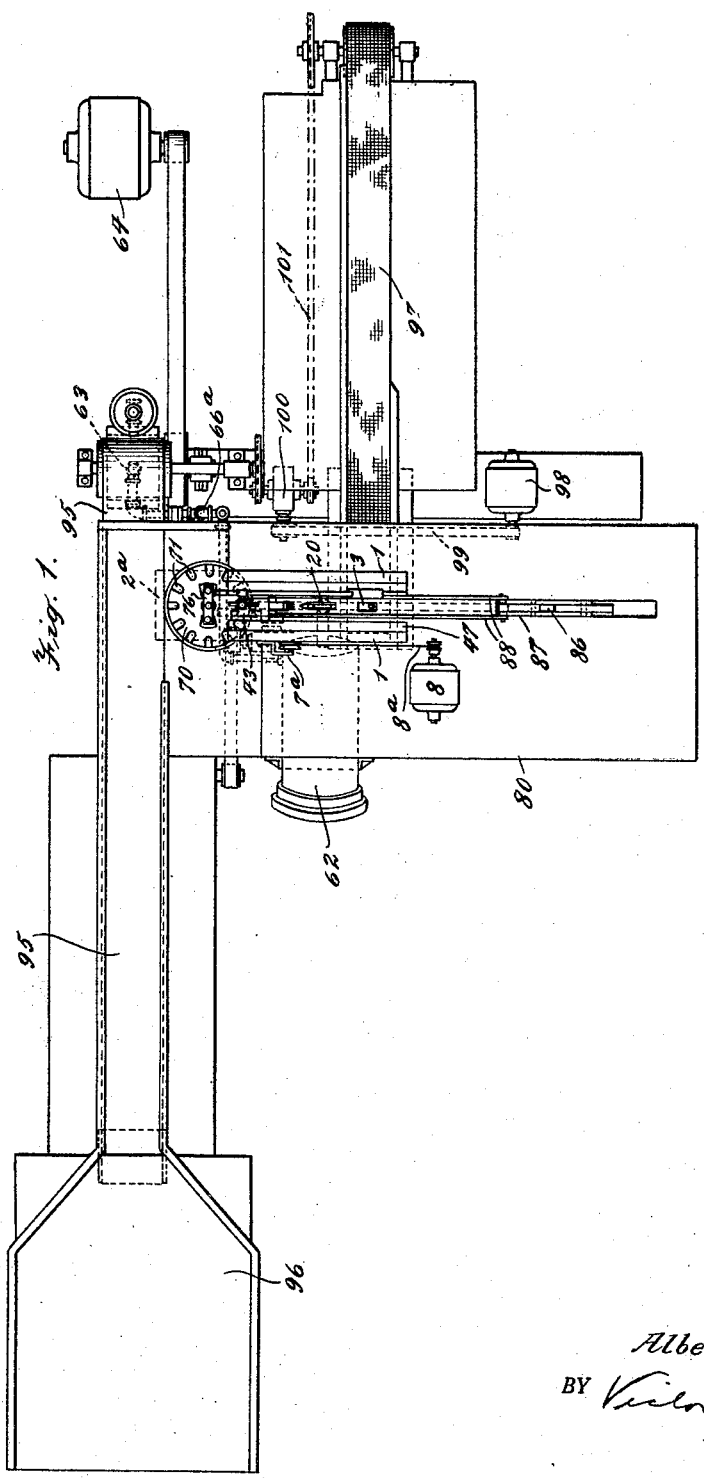
INVENTOR.
Albert K. Smith
BY
ATTORNEY

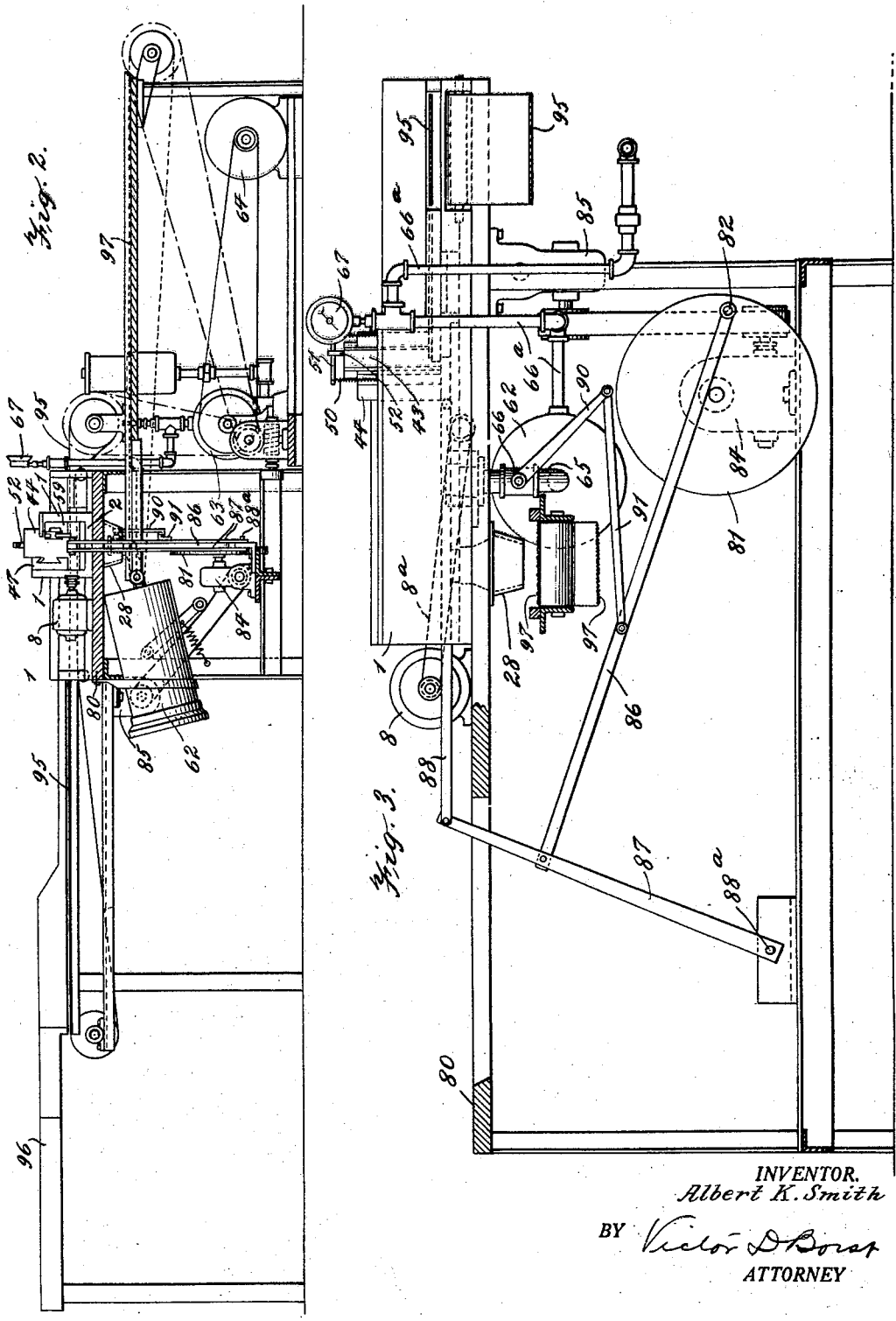

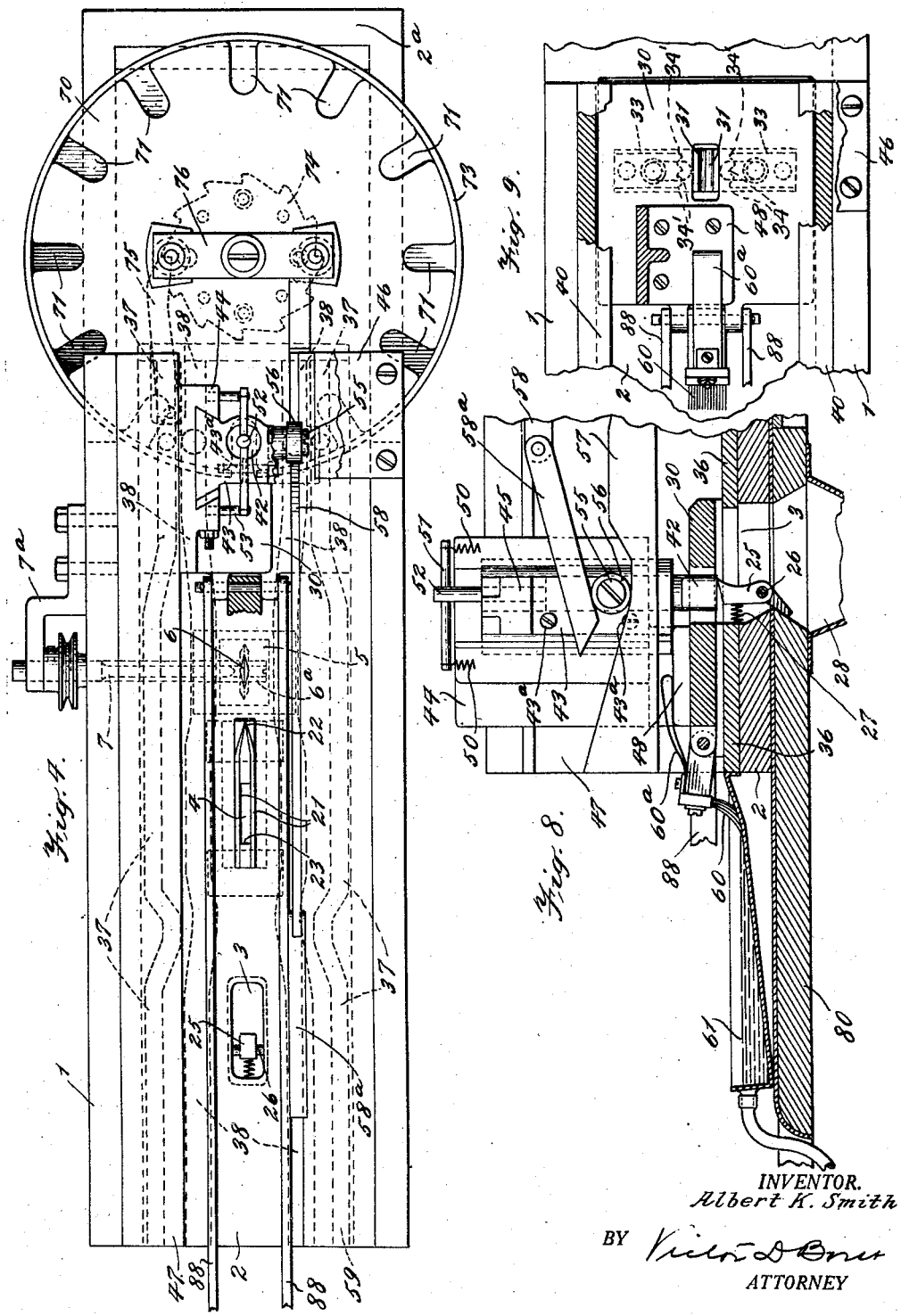
Sept. 8, 1931.   A. K. SMITH   1,822,382
DATE PITTING MACHINE
Filed Nov. 18, 1927   4 Sheets-Sheet 3
INVENTOR.
Albert K. Smith
BY
ATTORNEY Sept. 8, 1931.  A. K. SMITH  1,822,382
DATE PITTING MACHINE
Filed Nov. 18, 1927  4 Sheets-Sheet 4
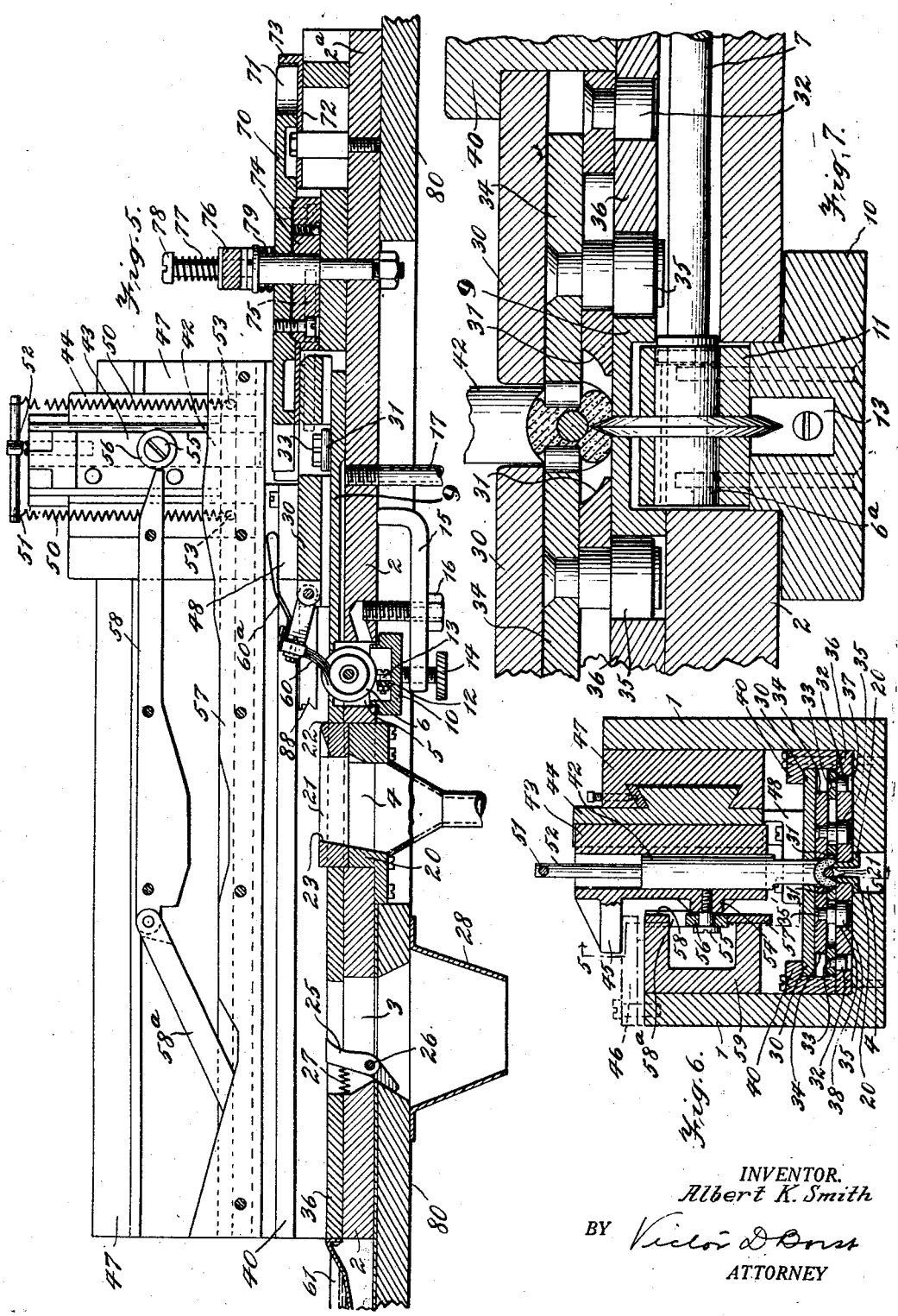
INVENTOR.
Albert K. Smith
BY
ATTORNEY Patented Sept. 8, 1931

1,822,382

UNITED STATES PATENT OFFICE

ALBERT K. SMITH, OF WEST ORANGE, NEW JERSEY, ASSIGNOR TO THE HILLS BROTHERS COMPANY INC., A CORPORATION OF NEW YORK

DATE PITTING MACHINE

Application filed November 18, 1927. Serial No. 234,082.

My invention relates to machines for pitting fruit and to such machines as are particularly adapted to remove the pits from dates.

In my copending application Serial No. 125,358 filed July 28, 1926, I have shown and described a machine of which this present application discloses an improvement. In my prior application I illustrated a machine in which a continuous chain conveyor was utilized to support and present the fruit to the various instrumentalities cooperating to remove the pits therefrom. In the present embodiment of my invention I employ the same basic principles as described in my prior application, i. e. I support the fruit in a conveyor, definitely locate and position the pit within the fruit, longitudinally split the fruit, spread the cut fruit open, extract the pre-positioned pit through the slit and reform the fruit to its normal shape.

It is the purpose of this invention to provide an improved machine embodying all or some of these steps of operation, which will be capable of continuous operation and which will definitely remove the pits from the fruit without unduly tearing the fruit and with a minimum amount of waste of the meat of the fruit.

In the present embodiment I employ a reciprocating carrier or conveyor which is fed or filled from a transfer table having pockets therein which are filled by the operator and which in turn cooperate with associated parts to transfer the fruit to the carrier. The conveyor has cooperating means for definitely positioning the pit within the fruit and for reforming the fruit subsequent to the pitting operation and is the medium by which the fruit is carried over the pit removing instrumentalities comprising a splitting knife, a combined spreader and pit ejector, and a fruit ejector. I also employ a suction effect to aid in the removal and disposal of the pits. The various parts are coordinated and operative in proper sequence to produce the desired results as will hereinafter be more fully described in connection with the drawings in which I have illustrated a date pitting machine.

Fig. 1 is a plan view of a machine embodying this invention and adapted to pit dates and including associated auxiliary conveyors;

Fig. 2 is a rear elevation of the same partly in section;

Fig. 3 is a side elevation;

Fig. 4 is an enlarged plan view of the pit extracting mechanism without the auxiliary conveyors;

Fig. 5 is a longitudinal section through the center of the extracting mechanism as indicated by line 5—5 of Fig. 6 and showing carrier in extreme forward position;

Fig. 6 is a transverse section through the center of the spreader illustrating the spreading of the split date;

Fig. 7 is a sectional detail of the splitting knife and adjacent parts illustrating the splitting of the date;

Fig. 8 is a sectional detail of the rear end of the extracting mechanism taken along the same planes as Fig. 5 but illustrating the carrier in a rear position, and Fig. 9 is a plan of the carrier illustrating the members with certain other parts thereof removed for the sake of clearness.

The pit extracting mechanism proper is mounted upon and within a main U-shaped casting having side walls 1 and a base 2 the latter being extended at the front end beyond the side walls to provide a platform 2a upon which a transfer conveyor is mounted, later to be described. The base 2 is provided with three openings 3, 4 and 5, disposed in a line along the center thereof through which the pit and fruit extracting elements project and function.

Within the front or right opening 5 there is mounted a rotary disk knife 6, keyed to a bushing 6a and is the first of the pit removing elements. This knife is carried upon the end of a shaft 7 which extends outwardly beyond the casting where it is supported in a bearing 7a. The shaft and knife may be driven from any suitable source such as a motor 8 and belt 8a. As shown the knife is positioned to have its cutting edge project above the base 2 to contact with and cut the lower portion of the date as it passes there-over. A cover or guard plate 9 rests upon the base 2 around the knife to cover the opening 5 and has a slot therein of sufficient size to allow the cutting edge of the knife to extend therethrough. The intermediate portion of the under side of plate 9 is slightly hollowed to provide a duct between the under side of the plate and base 2, the duct leading into opening 5. The bottom of opening 5 is closed by a cover plate 10 which serves to support a bearing member 11 for the knife shaft and has a central web 12 to which is secured a felt scraper 13 which serves to remove any gum collected by the knife and to keep the knife clean. The lower cover is held in place by a thumb nut 14 threaded into the end of a clamping arm 15 bolted to the base by a cap screw 16. Water may be circulated through the chamber formed within the opening 5, plate 9, and cover 10, through a pipe 17 tapped into the base 2 below and leading into the duct between the upper cover and the base and out through a central bore in cap screw 16, thus knife 6 may be kept clean, cool and lubricated.

The second pit extracting element, a combined spreading and pit ejecting member 20 hereinafter termed as a spreader-ejector is secured to the under face of the base by means of bolts or the like and extends upwardly through opening 4 above the upper face of the base 2. The spreader-ejector 20 consists of a block having an opening therethrough of the general shape of a date pit though somewhat larger, the longer side walls of which terminate at their upper edges into knife-like edges 21, which edges converge to a point 22 at the front end of the block. The rear edge 23 of the opening in the spreader-ejector 20 constitutes the pit ejector for extractor the pits and discharging them through the opening in member 20.

The third opening 4 is the discharge opening for the pitted dates. Within this opening is a date ejector 25 pivotally mounted to rock upon pin 26 and is spring pressed to its forward position by spring 27. A funnel-like hood 28 is secured to the under face of base 2 around opening 3 to direct the dates as they are thrown down by the ejector.

In order to present the dates to the extracting elements and support them while being operated upon, I provide a reciprocating carrier 30 mounted for sliding movement over the base 2 to support and carry the dates over the extracting elements. The carrier is formed with a pocket disposed near one end thereof of a size and shape approximating that of a date. The pocket is open upon the upper face and is closed at the bottom by a pair of slides 31 which slide within the carrier and meet at the center of the pocket to close the same. The meeting edges are concaved to conform to the shape of a date when closed in order to provide a curved surface upon which the date may rest and to reform the date to its normal shape after the pit has been extracted. A roller 32 is mounted on a stud 33 riveted or otherwise secured to the lower face of each slide near the outer ends thereof by means of which the slides are reciprocated through the aid of cam tracks in which the rollers travel, later to be described.

The carrier is also provided with a second pair of slides 34 which reciprocate across the pocket at approximately the center of its depth and which constitute the pit positioning means for centering the pit transversely within the date. For this purpose the inner ends of the slides 34 are formed with three pin-like projections 34', best shown in Fig. 9, which squeeze the date at three points on each side thereof without puncturing the same and definitely position the pit within the date. The lower surfaces of these slides also have rollers 35 secured thereto by means of which the centering slides are reciprocated. Rollers 35 are mounted upon pins 35' which are riveted to the slides and extend downwardly through slots formed in slides 34 and engage in cam tracks.

On the upper surface of the base 2 are secured three cam tracks 36 upon each side of the center thereof. The tracks are spaced to provide two cam grooves 37 and 38 upon each side of the center line and within which the rollers 32 and 35 travel respectively. At the right or forward end, the outer grooves 37 which control movements of the reforming slides are relatively close together, that is, are near the center of the base to cause the slides to meet and close the bottom of the pocket in the carrier. As the tracks extend toward the left as they approach the slitting knife and the spreader-ejector they diverge to withdraw the reforming slides during these operations. Immediately after passing the ejector the cam grooves 37 take a decided curve inwardly toward the center to again close the reforming slides to reform the date after which they immediately diverge. The inner cam grooves 38 controlling movement of the pit centering slides also start at the right end being close together but still separated enough that the slides 34 do not project into the pocket. As these guides approach the slitting knife they converge to bring the centering slides together to center the pit after which they diverge when opposite the spreader extractor. These tracks also take a decided course inwardly as they leave the ejector in order to bring the slides together simultaneously with the reforming slides to aid in reforming the date after which they also diverge again. Tracks 37 and 38 not only serve as the controlling medium for the slides 31 and 34 but also serve as the supporting surface over which the carrier 30 moves. The carrier is held down upon the tracks by two L-shaped guide rails 40 bolted or otherwise secured to the base.

In order to retain the date in the pocket of the carrier during its passage over the extracting elements and to assist in the extraction of the pit there is provided a plunger 42 adjustably mounted for vertical movement in a split holder 43 and held in adjusted position by bolts 43ª, which holder in turn is slidably secured to a slide block 44 for vertical movement therein through a vertical dovetail joint. Holder 43 is provided with a laterally projecting foot 45 adapted to contact with a leather pad or other resilient pad 46 secured to the top of the front end of the side wall 1 of the main casting to break the initial drop of the plunger. Block 44 in turn is mounted for horizontal sliding movement parallel to base 2 through the medium of a horizontal dovetail connection with a horizontal guide strip 47 secured to the side wall 1 of the main casting. A bracket 48 secures slide block 44 to carrier 30 to impart horizontal reciprocating movements of carrier 30 to block 44 and through its connected parts to plunger 42. Plunger 42 is constantly and resiliently urged downwardly by means of a pair of tension springs 50 secured at one end to a cross pin 51 passing through a rod 52 rigidly secured to the upper end of plunger 42 and at the other end to a pair of pins 53 secured to the lower end of block 44. Holder 43 also is formed with a boss 54 projecting from one side thereof into which is threaded a stud 55 supporting a roller 56. Roller 56 travels upon a lower cam rail 57 upon its rearward or left movement and upon an upper cam rail 58, having a rear portion 58ª pivoted thereto, upon its forward or return movement. The two stretches of cam track 57 and 58 are rigidly secured to a U-shaped track support 59 which is fastened to one side 1 of the main casting. The front end of upper track 58 stops short of the lower track, thus as the roller travels off the right end of track 58 plunger 42 will drop till roller 56 contacts with the lower track 57. As track 57 approaches the cutter it takes a slight drop to permit the plunger to descend upon the date to hold the same firmly while it is being slit by the knife. As the track 57 passes further rearwardly and approaches the spreader-ejector it takes a further drop to cause the plunger to depress the date even lower and press upon the pit to first cause the split date to be spread open to then cause the rear edge 23 of the ejector to engage the pit and extract it from the date. Track 57 takes a still lower drop as it reaches a point opposite the date ejector to allow the plunger to depress the reformed date to cause it to be engaged by the date ejector 25 and extracted from the carrier. After the roller 56 passes beyond this point on the lower cam track 57 the carrier will start forward, thus carrying plunger 42 and roller 56 with it. In making the return movement roller 56 will travel up the rear portion 58ª of the upper track, which portion is pivoted to the main portion 58 and allowed to drop down upon the lower stretch, after which it will travel along the upper stretch 58 until it drops off the front end thereof to repeat its cycle of movements.

To the rear end of the carrier is pivotally attached a brush 60 (Figs. 5 and 8) resiliently urged down by a spring 60ª and positioned to dip into a water pan 61 at the end of each stroke of the carrier and to wipe over the extracting elements during the movements of the carrier.

As an aid in extracting the pits the opening through the spreader-ejector may be placed under a suction by connecting the same to a vacuum tank 62 which is kept under partial vacuum by a pump 63 driven by motor 64. Suitable piping is indicated at 65 including a valve 66 and connects the tank to the ejector whereas other piping 66ª connects the tank to the pump and a suitable gage 67. The valve 66 may be connected by proper mechanism, to be described later, to cause the valve to be opened for a short period only as the carrier passes over the ejector.

As a means to automatically feed the dates to the carrier I employ a rotary disk transfer conveyor 70 (Figs. 4 and 5) rotatably mounted upon the forward end 2ª of the base 2 and with a portion of its periphery overlying the date pocket in carrier 30 when the latter member is in its foremost position. A series of slots 71 of the same size as the pocket in the carrier are disposed radially around the portion of the periphery of the disk which overhangs the carrier. A stationary guard disk 72 underlies the conveyor disk at all points except under that portion overlying the carrier to close the bottom of the slots to provide date pockets which disk 72 has an upturned peripheral flange 73 surrounding the outer edge of the conveyor disk. To the underside of the center portion of the transfer conveyor disk is secured a ratchet 74 which is engaged by a pawl 75 projecting from and secured to the end of carrier 30. Ratchet 74 has as many faces as there are slots in the conveyor disk and is so positioned that as the carrier comes forward on each stroke pawl 75 engages a face of the ratchet and rotates the transfer disk a sufficient circumferential distance to bring a slot 71 therein directly over the pocket in the carrier whereby dates placed in the slots of the disk may drop or be forced into the pocket of the carrier by plunger 42 when making its first drop as roller 56 rides over the edge of track 58 thus positively transferring those dates which do not drop by gravity into the carrier. A friction drag is provided in the form of a cross member 76 which is resiliently held down against the upper surface of the transfer disk by means of a spring 77 surrounding stud 78 and acting against a counter spring 79.

The entire mechanism as carried by the main casting may be supported upon a table 80 to which may also be secured suitable driving mechanism. For this purpose I have shown an eccentric comprising a disk 81 having a pin 82 secured adjacent the periphery thereof and driven through a suitable gear reduction 84 by a motor 85. A lever 86 connects to pin 82 and to a point intermediate of a second lever 87 pivoted at one end to the table at 88ª and at the other end to a pair of connecting links 88 pivotally attached to the rear of carrier 30. Thus as disk 81 is rotated carrier 30 and plunger 42 will be reciprocated. Valve 66 may also be controlled through the same drive by means of an arm 90, and connecting lever 91 connecting arm 90 to lever 86 thus operating the valve in accordance with oscillations of the carrier.

If so desired auxiliary conveyors may be provided to carry the dates to the transfer conveyor 70 and to convey the pitted dates away for disposal. For this purpose I have provided a conveyor 95 which carries the date from a dumping table 96 to the transfer conveyor 70. A second conveyor 97 which underlies the hood 28 at one end thereof carries the pitted fruit away from the machine to suitable packing stations (not shown). The two auxiliary conveyors are driven from a single motor 98 through a belt 99, transmission gearing 100. and chain 101 traveling over a suitable sprocket.

In operation the dates are deposited in bulk upon table 96, are separated by operators and placed on conveyor 95 which carries them to the transfer conveyor 70. Another operator places the dates as they are fed by belt 95 in slots 71 in disk 70. Disk 70 carries the dates and places them one by one over the pocket in the carrier 30 in proper timed sequence, that is, a slot 71 is immediately above the pocket in the carrier at each end of its forward stroke. The plunger 42 then descends as roller 56 rides over the end of track 58 and forces the date if it has not dropped by gravity, into the carrier. As the carrier travels rearwardly (to the left in Fig. 5) the reforming slides 31 retract and the centering slides converge to center the pit, plunger 42 descends slightly, and the date is carried over the rotating knife 6 whereby it is slit longitudinally from end to end. Further movement of carrier 30 causes the centering slides to diverge and plunger 42 to drop a little lower whereby the fore part 22, and side walls 21 of the spreader separates the sides of the slit date and the rear edge 23 engages the pit which has been depressed by plunger 42. Still further rearward movement of the carrier causes both the reforming and centering slides to converge and reform the pitted date and then immediately to retract and also carries the reformed date over ejector 25 at which time the plunger 42 descends still lower to coact with ejector 25 to discharge the fruit from the carrier whereupon it falls upon conveyor 97. Carrier 30 is then moved a little more to the rear to permit roller 56 to pass under the rear section of track 58ª after which the carrier is returned forward with roller 56 traveling over track 58 to repeat its cycle of operations. During the reciprocations of the carrier, brush 60 dips into tank 61 and brushes over the extracting elements to clean and lubricate them. It is also to be noticed that as lever 86 moves rearwardly to impart motion to lever 87 and to carrier 30, movement will also be imparted to lever 91 and arm 90 whereby valve 66 will be opened as carrier 30 travels rearwardly thus creating a suction around the ejector each time a pit is extracted thereby thus aiding in the removal of the pit.

It is apparent that various changes may be embodied in the details of structure without departing from the spirit and scope of the invention as defined in the appended claims.

I claim:

1. In a fruit pitting machine, pit extracting elements including a slitting knife and a pit extractor, a carrier for supporting the fruit while subjecting the fruit to the action of the pit extracting elements, a transfer conveyor for receiving the fruit and conveying it to said carrier, and means for engaging the fruit on said conveyor and moving it therefrom to said carrier.

2. In a fruit pitting machine, a carrier for supporting the fruit, means for retaining the fruit in said carrier, a transfer conveyor for receiving the fruit and transferring it to said carrier to be pitted, means for engaging the sides of the fruit over restricted areas and deforming the meat of the fruit to position the pit therein, and means for removing the pit from the fruit.

3. In a fruit pitting machine, pit extracting elements including a knife and a pit extractor, a carrier including means for supporting the fruit while subjecting the fruit to the action of the pit extracting elements, a transfer conveyor for receiving the fruit and conveying it to said carrier and means for transferring the fruit from said conveyor to said carrier and for thereafter retaining the fruit in said carrier during the pit extracting operation.

4. In a fruit pitting machine, pit extracting elements, a carrier for conveying the fruit to said elements to be acted on thereby, a reciprocating plunger mounted on said carrier to retain the fruit therein and means for moving said plunger to vary the position of the fruit in said carrier at predetermined intervals.

5. In a fruit pitting machine, pit extracting elements including a slitting knife and a pit extractor, a carrier for conveying the fruit over said elements, centering means on the carrier for positioning the pit within the fruit, a reciprocating plunger mounted on said carrier to retain the fruit therein and means for moving said plunger to depress the pit to cause it to be engaged by the pit extractor.

6. In a fruit pitting machine, a slitting knife for slitting the fruit, a combined spreader and pit ejector for spreading the cut fruit, and extracting the pit therefrom, a movable support for advancing the fruit to be acted on by said knife and combined spreader and pit ejector successively, and means for altering the position of the fruit in said support during its movement.

7. In a fruit pitting machine, a slitting knife for slitting the fruit, a combined spreader and pit ejector for spreading the cut fruit and extracting the pit therefrom, a movable support for advancing the fruit to said knife and combined spreader and pit extractor successively, and means on said support for engaging the sides of the fruit and exerting pressure on the meat thereof to deform the fruit and center the pit within the fruit.

8. In a fruit pitting machine, a slitting knife for slitting the fruit, a combined spreader and pit ejector for spreading the cut fruit and extracting the pit therefrom, a movable support for advancing the fruit to said knife and extractor successively, and means on said support operable to engage and deform the meat of the fruit to position the pit therein.

9. In a fruit pitting machine, a slitting knife for cutting the fruit, an ejector for removing the pit through the slit, a carrier for supporting and passing the fruit over the knife and ejector and a fruit ejector for discharging the fruit from said carrier comprising a rockable finger adapted to engage the fruit and extract it from said carrier.

10. In a fruit pitting machine, a slitting knife for cutting the fruit, a pit ejector for removing the pit from the slit fruit, a carrier for supporting the fruit and passing it over said knife and ejector, a lubricant reservoir and a brush carried by said carrier operable to receive lubricant from said reservoir and to clean said knife and ejector for each movement of said carrier.

11. In a fruit pitting machine, a slitting knife for cutting the fruit, an ejector for extracting the pit from the cut fruit, a pair of reciprocating reforming elements for reforming the fruit after the pit is extracted and a carrier for supporting said fruit and reforming elements and passing said fruit over said knife and ejector.

12. In a fruit pitting machine, a slitting knife for slitting the fruit, a spreader and pit ejector for spreading the slit in the fruit and extracting the pit therethrough and a carrier for supporting the fruit and passing it over said knife and ejector, said carrier having a pair of centering members for definitely centering the pit prior to its extraction and a pair of reforming elements for reforming the fruit after the pit has been extracted therefrom.

13. In a fruit pitting machine, a carrier for supporting the fruit, a base underlying said carrier and having a slitting knife, and a pit ejector mounted therein over which the carrier passes, said base also having an opening therein adjacent said ejector through which the pits are discharged and means for creating a suction through said opening to aid in the discharge of the pits.

14. In a fruit pitting machine, a sliding carrier for supporting the fruit, a base underlying said carrier, said base having a slitting knife, and a pit ejector mounted therein over which the carrier passes, said base also having an opening therein adjacent said ejector through which the pits are discharged and means for creating a suction through said opening to aid in the discharge of the pits said means being operable as the carrier passes over said opening and inoperable at other positions of said carrier.

15. In a fruit pitting machine, a reciprocating carrier for supporting the fruit, a base underlying said carrier, said base having a slitting knife, a spreader and a pit ejector mounted therein over which the carrier passes, said ejector being disposed to discharge the pits through said spreader and a suction pump connected to said spreader to aid in the discharge of the pits therethrough.

16. In a fruit pitting machine, a date carrier for supporting a date, a pair of opposed slides terminating at their inner ends into projections, means for moving said slides toward each other to center the pit therebetween, a knife for slitting the date and an ejector for removing the pit from the date.

17. In a fruit pitting machine, a carrier for the fruit, members on the carrier in part serving as a support for the fruit, means on the carrier for centering the pit, a pit extractor, means for acting on said members to cause them to advance toward and retreat from the fruit, and means for shifting the fruit in said support to position it for the operation of said extractor.

18. In a fruit pitting machine, a carrier for the fruit, pit centering means, means engaging the fruit in the carrier and operable to vary the position of the fruit therein, and a pit extractor engaging the pit in the fruit on the carrier and removing it.

19. In a fruit pitting machine, a movable support for the fruit, pit centering means, a plunger on the support for holding the fruit in position therein, means for slitting the fruit on the support, means for actuating said plunger to change the position of the fruit in said support after it has been acted on by said slitting means, and means acting on the slitted fruit in its changed position on the carrier to extract the pit therefrom.

20. In a fruit pitting machine, a movable support for the fruit, a knife for slitting the fruit, and means for extracting the pit from the slitted fruit comprising a pair of knife edges diverging in the direction of movement of the support and an extractor member at one end of said knife edges adapted to engage and extract the pit as the fruit is advanced.

21. In a fruit pitting machine, a movable support having a pocket, a pair of members one on each side of said pocket, said members being movable toward and away from each other and in their adjacent positions providing a bottom for said pocket, means for holding the fruit in place in said pocket, and means for advancing and retracting said members.

22. In a fruit pitting machine, a movable support having a pocket, a pair of members one on each side of said pocket, said members being movable toward and away from each other and in their adjacent positions providing a bottom for said pocket, means for holding the fruit in place in said pocket, means for advancing and retracting said members, and means for actuating said holding means to vary the position of said fruit in the pocket when said members are in a retracted position.

23. In a date pitting machine, a carrier having a pocket for holding a date, a pair of members mounted in opposite walls of the pocket and having relatively long narrow faces parallel to the long axis of the date in the pocket, means for moving said members toward each other to cause the faces thereof to engage the sides of the date to pinch the meat thereof and center the pit, extracting means for engaging the end of the pit, and means for effecting relative movement of said means and carrier to cause extraction of said pit.

24. In a date pitting machine, a carrier having a pocket for holding a date, a pair of members mounted in opposite walls of the pocket, means for moving said members toward each other to cause them to squeeze said date and deform the meat thereof to position the pit within the date, a pit extracting element operable to engage the centered pit at one end, and means for effecting relative longitudinal movement of said date and pit extracting element to cause extraction of said pit.

25. In a date pitting machine, a carrier having a pocket for holding a date, a pair of members mounted in openings in the opposite walls of said pocket and movable toward and away from each other, said members having operating surfaces which are relatively long and narrow with their length parallel to the long axis of the date, means for causing said members to approach each other whereby said surfaces engage the meat of the date and exert pressure on it to center the pit with respect to said pocket, and a pit extracting element operable to engage the pit at one end and extract it from the date during the movement of the carrier.

26. In a date pitting machine, a carrier having a pocket for holding a date, a pair of members mounted in openings in the opposite walls of said pocket and movable toward and away from each other, said elements having operating surfaces which are relatively long and narrow and formed with spaced projections, means for causing said members to approach each other whereby said surfaces engage the meat of the date and exert pressure on it to deform the meat and center the pit with respect to the pocket, a pit extracting element operable to engage the pit at one end, and means for effecting relative longitudinal movement of said date and element to cause extraction of said pit.

In witness whereof, I hereunto subscribe my signature.

ALBERT K. SMITH.